United States Patent
Goyal et al.

(10) Patent No.: US 11,068,537 B1
(45) Date of Patent: Jul. 20, 2021

(54) PARTITION SEGMENTING IN A DISTRIBUTED TIME-SERIES DATABASE

(71) Applicant: Amazon Technologies, Inc., Seattle, WA (US)

(72) Inventors: Dumanshu Goyal, Seattle, WA (US); Timothy A. Rath, Des Moines, WA (US); Eric Coll, Bothell, WA (US); Gaurav Gupta, Sammamish, WA (US); Lonnie J. Princehouse, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 401 days.

(21) Appl. No.: 16/216,580

(22) Filed: Dec. 11, 2018

(51) Int. Cl.
 *G06F 16/00* (2019.01)
 *G06F 16/901* (2019.01)
 *G06F 16/27* (2019.01)

(52) U.S. Cl.
 CPC ........ *G06F 16/9024* (2019.01); *G06F 16/278* (2019.01)

(58) Field of Classification Search
 CPC .............................. G06F 16/9024; G06F 16/278
 See application file for complete search history.

(56) References Cited

U.S. PATENT DOCUMENTS

| 8,132,046 | B2 | 3/2012 | Varghese |
| 8,276,154 | B2 | 9/2012 | Toub et al. |
| 8,335,765 | B2 | 12/2012 | Sivasubramanian et al. |
| 8,386,540 | B1 | 2/2013 | McAlister et al. |
| 8,595,547 | B1 | 11/2013 | Sivasubramanian et al. |
| 8,601,112 | B1 | 12/2013 | Nordstrom et al. |
| 9,286,001 | B2 | 3/2016 | Skjolsvold et al. |
| 9,449,122 | B2 | 9/2016 | Haas et al. |
| 9,607,019 | B1 * | 3/2017 | Swift ................... G06F 16/2255 |
| 9,607,067 | B2 | 3/2017 | Haas et al. |
| 9,626,374 | B2 * | 4/2017 | Hirsch ................ G06F 16/1752 |
| 9,672,257 | B2 * | 6/2017 | Tobin .................. G06F 16/2477 |
| 9,773,015 | B2 | 9/2017 | Guo et al. |
| 9,817,727 | B2 | 11/2017 | McAlister et al. |
| 9,836,492 | B1 * | 12/2017 | Hermanson ......... G06F 16/2272 |
| 9,934,107 | B1 | 4/2018 | Chikkanayakanahally et al. |

(Continued)

OTHER PUBLICATIONS

Gunnar Mathiason, "Segmentation in a Distributed Real-Time Main-Memory Database", Sep. 2002, pp. 1-115 (Year: 2002).*

(Continued)

*Primary Examiner* — Jared M Bibbee
(74) *Attorney, Agent, or Firm* — Robert C. Kowert; Kowert, Hood, Munyon, Rankin & Goetzel, P.C.

(57) ABSTRACT

Methods, systems, and computer-readable media for partition segmenting in a distributed time-series database are disclosed. A first host receives a request to store a data element in a tile comprising linked segments including a head segment and a tail segment. The head and tail segments are associated with the same spatial and temporal boundaries, and the data element is within those boundaries. The first host determines that the data element is not stored in the head segment and forwards the data element to a next segment of the tile. An additional host receives a request to store the data element in the tail segment. The additional host determines that the data element is not stored in the tail segment and then stores the data element in the tail segment.

20 Claims, 8 Drawing Sheets

(56) References Cited

U.S. PATENT DOCUMENTS

| 10,007,513 | B2 | 6/2018 | Malladi et al. | |
| 2018/0189337 | A1* | 7/2018 | Milby | G06F 16/284 |
| 2020/0167360 | A1* | 5/2020 | Rath | G06F 3/0644 |
| 2020/0167361 | A1* | 5/2020 | Princehouse | G06F 3/067 |

OTHER PUBLICATIONS

U.S. Appl. No. 16/116,791, filed Aug. 29, 2018, Mustafa Ozan Ozen.
U.S. Appl. No. 16/176,629, filed Oct. 31, 2018, Dumanshu Goyal.
U.S. Appl. No. 16/199,102, filed Nov. 23, 2018, Timothy A. Rath.
U.S. Appl. No. 16/199,103, filed Nov. 23, 2018, Timothy A. Rath.
U.S. Appl. No. 16/199,078, filed Nov. 23, 2018, Timothy A. Rath.
U.S. Appl. No. 16/267,330, filed Feb. 4, 2019, Dumanshu Goyal.

* cited by examiner

PARTITION SEGMENTING IN A DISTRIBUTED TIME-SERIES DATABASE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1:
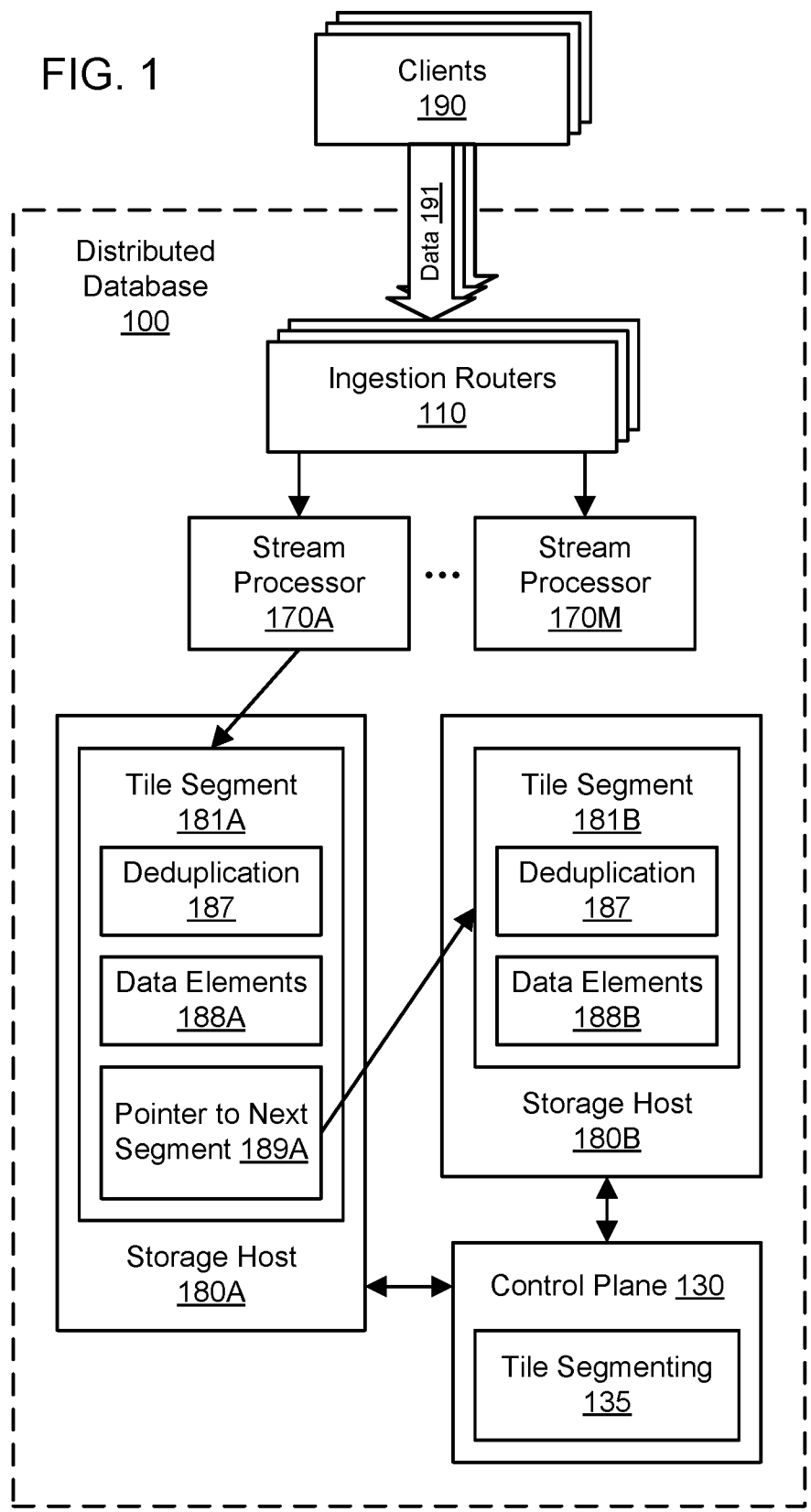
FIG. 1 illustrates an example system environment for partition segmenting in a distributed time-series database, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for partition segmenting in a distributed time-series database are described. A distributed database may include a set of partitions that are stored using a set of storage hosts that are distributed across various data centers, availability zones, or other logical or geographical locations. The contents of partitions may be written by a set of stream processors, also referred to as writers, that process one or more data streams in a distributed manner. The data stream(s) may represent data elements with timestamps and belonging to one or more time series. The storage hosts may offer low-latency access to a "hot tier" of data, such as the most recent data elements from the stream(s). A partition may represent spatial boundaries such that the partition is designated to store data elements from one or more time series. A partition may also represent temporal boundaries such that the partition is designated to store data elements having timestamps within a window of time. Due to the spatial and temporal dimensions, partitions may be said to represent two-dimensional tiles. For a given time series, tiles representing older windows of time may be termed "closed" while a tile representing a current window of time may be termed "open," and ingested data elements may typically belong to (and be written to) the window of time associated with the open tile. Nevertheless, older data elements may be received under some circumstances, and such out-of-order data may belong to the window of time of a closed tile. To observe the temporal and spatial boundaries of the tiles, the out-of-order data should not be written to the currently open tile; however, the closed tile corresponding to the timestamp(s) of the ingested data may not have sufficient storage capacity for the out-of-order data to be added.

Using the techniques described herein, the storage capacity of a tile may be extended using a chain of one or more additional segments, all of which may share the temporal and spatial boundaries of the tile. An additional segment may be allocated on a different host and may be used to store out-of-order data. Each non-terminal segment, beginning with a head segment, may include a pointer or other reference to the next segment in the chain. The addition of a segment may occur when the existing tail segment is preparing to exhaust its designated storage capacity. Segmentation may be a local decision dependent upon the storage capacity of a host, and so segmentation schemes may vary for replicas of the same tile, e.g., in different availability zones. When a data element is received by the distributed database, a stream processor may send a request to store the data element to the head segment of the tile whose temporal and spatial boundaries include the data element. The head segment may perform deduplication and discard the request if another data element of the same time series and with the same timestamp is already stored in the segment. If not, then the head segment may forward the request to the next segment in the chain. The next segment may perform deduplication and discard the request if another data element of the same time series and with the same timestamp is already stored in the segment. If not, and the segment is the terminal or tail segment, then the segment may store the data element. If the segment instead has a pointer to another segment, then the segment may forward the request again to the next segment. The local deduplication or forwarding may continue down the chain of segments until the data element is discarded or stored in the tail segment. By using a chain of segments to store data elements within a common set of spatial and temporal boundaries, but performing deduplication to eliminate the storage of duplicate data, the segments may be queried efficiently by a query processor. The query processor may perform query predicate pushdown to individual segments and aggregate the results from the segments without needing to perform additional deduplication or complex filtering of the results. Using the techniques described herein, a distributed group of tile segments may be used to maintain the designated data boundaries of tiles while compensating for the different storage capacities of different hosts, all while maintaining high availability of access to data and low latency of access to data.

As one skilled in the art will appreciate in light of this disclosure, embodiments may be capable of achieving certain technical advantages, including some or all of the following: (1) improving the scalability of a distributed database by permitting the addition of segments to tiles; (2) improving the functionality of a distributed database by permitting the addition of out-of-order data to closed tiles instead of discarding the out-of-order data; (3) improving the use of memory and/or storage resources of a distributed database by segmenting a tile across different hosts based on their respective storage capacities; (4) improving the performance of queries by proactively performing deduplication when storing data in tile segments and allowing for query predicate pushdown to individual segments; (5) improving the use of network resources by adding segments to tiles for storing new data rather than moving existing data to other tiles; and so on.

FIG. 1 illustrates an example system environment for partition segmenting in a distributed time-series database, according to one embodiment. In one embodiment, one or more streams of data 191 may be provided to a distributed database 100 by a set of clients 190. Data elements of the stream(s) 191 may be provided to the database 100 over time, such that some elements may be older and some elements may be newer. Clients 190 may provide data streams 191 for various ranges or series of data, such as different time series or other partitions of a larger dataset. Time-series data may include a stream or sequence of data elements that have timestamps as well as tags and/or other metadata. A time series may be uniquely identified by a time-series identifier. The time-series identifier may represent a name or a complex value, such as a combination of values of one or more dimensions associated with the time series. For example, a particular time series may be uniquely identified within the database 100 by the combination of a region name, a sensor name, and so on. The distributed database 100 may divide the data 191 from the clients 190 into non-overlapping partitions. In one embodiment, the ingested data may be spatially partitioned along non-overlapping spatial boundaries according to the time series or range of the data, one or more tags associated with the data, the region that produced the data, the category to which the data belongs, and/or other suitable metadata. A partition may include one time series or multiple time series. Partitions may also be partitioned along non-overlapping temporal boundaries. Due to the spatial and temporal dimensions, partitions may be said to represent two-dimensional tiles. For a given time series, tiles representing older windows of time may be termed "closed," while a tile representing a current window of time may be termed "open."

A fleet of ingestion routers 110 may take elements of the data 191 published by clients 190 and route those elements to appropriate stream processors 170A-170M. In one embodiment, the data may be routed through one or more intermediate components, such as a set of durable partitions managed by a storage service or a set of durable shards managed by a streaming service. The data 191 may be routed according to routing metadata, e.g., that maps different time series or ranges of the data to different stream processors.

The distributed database 100 may include a set of stream processors 170A-170M (also referred to as writers or stream processing nodes) that process data in a distributed manner. In one embodiment, for example, stream processors may perform reordering, deduplication, aggregation of different time periods, and other transformations on time series data. In one embodiment, stream processors may be used to store the data using storage hosts of the distributed database 100, such as hosts 180A and 180B. In one embodiment, the distributed database 100 may have a one-to-one mapping of data partitions to stream processors. By restricting a given series or range of the data to a single stream processing node, tasks such as reordering and deduplication may be simplified. The storage hosts 180A and 180B may, along with other hosts, implement a "hot tier" of the distributed database 100. The hot tier may include data that is expected to be in higher demand than a "cold tier" of data. For example, the hot tier may be used to store newer elements of the data 191, while the cold tier may store older elements as well as newer elements. The hot tier may offer high availability and low latency for both ingestion and queries, while the cold tier may offer less expensive but higher-latency storage. In one embodiment, the storage hosts of the hot tier may store data elements of tiles using volatile storage resources such as Random Access Memory (RAM). In one embodiment, the cold tier may store data elements of tiles using nonvolatile storage resources such as hard disks. The hot tier may have a retention window, e.g., per time series or per client. In one embodiment, the stream processors 170A-170M may write newly ingested data to both the hot tier and the cold tier, and data elements older than the retention window (e.g., 24 hours) may be expired from the hot tier while remaining in the cold tier.

Data elements ingested by the routers 110 may typically belong to the window of time associated with the open tile for a given time series. Nevertheless, older data elements may be received under some circumstances, and such out-of-order data may belong to the window of time of a closed tile. To observe the temporal and spatial boundaries of the tiles, the out-of-order data should not be written to the currently open tile; however, the closed tile corresponding to the timestamp(s) of the ingested data may not have sufficient storage capacity for the out-of-order data to be added. Using the techniques described herein, the storage capacity of a tile may be extended using a chain or linked list of one or more additional segments, all of which may share the temporal and spatial boundaries of the tile. An additional segment may be allocated on a different host and used to store newly ingested data belonging to the spatial and temporal boundaries of the tile. If the tile to be segmented represents a closed tile, then the additional segment may be used to store out-of-order data. Out-of-order data may be ingested, for example, if a client device that provides sensor values in a time series is unable to connect with the database 100 for a period of time, but then connectivity is restored. However, open tiles may also be segmented and used to store current data in a chain of segments.

In one embodiment, a control plane 130 of the distributed database 100 may manage the segmenting 135 of tiles in the distributed database 100. A tile may initially include one segment 181A that represents both the head segment and the tail segment. At some point in time, the control plane 130 may add a new segment 181B to the tile. The existing segment 181A may remain the head segment, but the new segment 181B may represent a new tail segment. When the new tail segment 181B is added, the data elements 188A stored in the segment 181A may be deemed immutable, such that no new data may be written to the segment 181A and no existing data may be deleted from the segment 181A. Each non-terminal segment, beginning with the head segment 181A, may include a pointer or other reference to the next segment in the chain. The new segment 181B may be used to store a different set of data elements 188B than the head segment 181A. The data elements 188A and 188B may be within the same temporal and spatial boundaries of the tile. However, the segments of the tile may be pairwise disjoint, such that the intersection of the data elements 188A and the data elements 188B (as defined by their timestamps and time-series identifiers) is the empty set. The contents of a tile may represent the union of the contents of all of the segments of the tile.

In one embodiment, the control plane 130 may add a new segment (such as segment 181B) based (at least in part) on the storage capacity of the storage host 180A (e.g., the volatile storage capacity provided by RAM, if tiles are stored in memory) or the tile segment 181A. In one embodiment, a segment may be allocated with a maximum capacity, and the control plane 130 may monitor the remaining capacity of the segment or receive updates about the remaining capacity from the host. For example, the addition of a new tail segment may occur when the existing tail segment is preparing to exhaust its designated storage capacity. As another example, the addition of a new tail segment may occur when the existing tail segment has already exhausted its storage capacity. In one embodiment, a segment may not be allocated with a maximum capacity, but the storage capacity of its host may be affected by the use of the host to store other tiles. Again, the control plane 130 may monitor the remaining capacity of the host or receive updates about the remaining capacity from the host. Segmentation may be a local decision that is dependent upon the storage capacity (e.g., the volatile storage capacity provided by RAM) of a particular segment or host. The decision to add a segment may be made by the control plane 130 and/or the host that stores the current tail segment.

In one embodiment, different segments of a tile may be stored using different storage hosts. To perform tile segmenting 135, the control plane 130 may select a storage host for the new segment from a set of available storage hosts. The available hosts may vary in their storage (e.g., volatile memory) resources as well as in other characteristics. A given storage host of the distributed database 100 may be used to store different tiles (or segments of different tiles). The control plane 130 may select a storage host for the new segment based (at least in part) on the remaining storage capacity of the selected host. For example, if a first host has three gigabytes of available RAM while a second host has one gigabyte of available RAM, and neither the first nor the second host already stores a segment for a given tile, then the control plane 130 may select the first host to store a new segment for the tile. In one embodiment, a host may be selected for a new tile segment in order to maximize the capacity of the new tile and minimize the total number of segments for the tile. When a new tail segment is added to the tile shown in FIG. 1, the control plane 130 may instruct the selected host 180B to allocate a new tile segment 181B. The control plane 130 may also instruct the old tail segment 181A to add the pointer 189A to the new segment 181B. As discussed above, the old segment 181A may be deemed immutable such that no new data may be written to the data elements 188A and no existing data may be deleted from the data elements 188A. Additionally, the control plane may update a map of tile segments that it maintains.

The pairwise disjoint property of the various segments of a tile may be maintained by performing local deduplication 187 at each segment. When a data element is received by the distributed database 100, a stream processor 170A may send a request to store the data element to the head segment 181A of the tile whose temporal and spatial boundaries include the data element. The head segment 181A may perform deduplication 187 and discard the request if another data element of the same time series and with the same timestamp is already stored in the segment with the immutable set of data elements 188A. If not, then the head segment 181A may forward the request to the next segment in the chain using the pointer or reference 189A. The next segment 181B may perform deduplication 187 and discard the request if another data element of the same time series and with the same timestamp is already stored in the segment with the data elements 188B. If not, and the segment is the terminal or tail segment as shown in FIG. 1, the segment 181B may store the newly ingested data element with the data elements 188B. As shown in FIG. 1, a distributed group of tile segments may be used to maintain the designated data boundaries of tiles while compensating for the different storage capacities of different hosts, all while maintaining high availability and low latency of access to a hot tier of data.

In one embodiment, the stream processors 170A-170M and/or storage hosts 180A-180B of the distributed database 100 may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide resources such as the stream processors 170A-170M and/or storage hosts 180A-180B. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the distributed database 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants)

simultaneously, the provider network may be said to offer multi-tenancy and may be termed a multi-tenant provider network. In one embodiment, the functionality of the provider network, such as the distributed database 100, may be offered to clients in exchange for fees.

Figure 8:
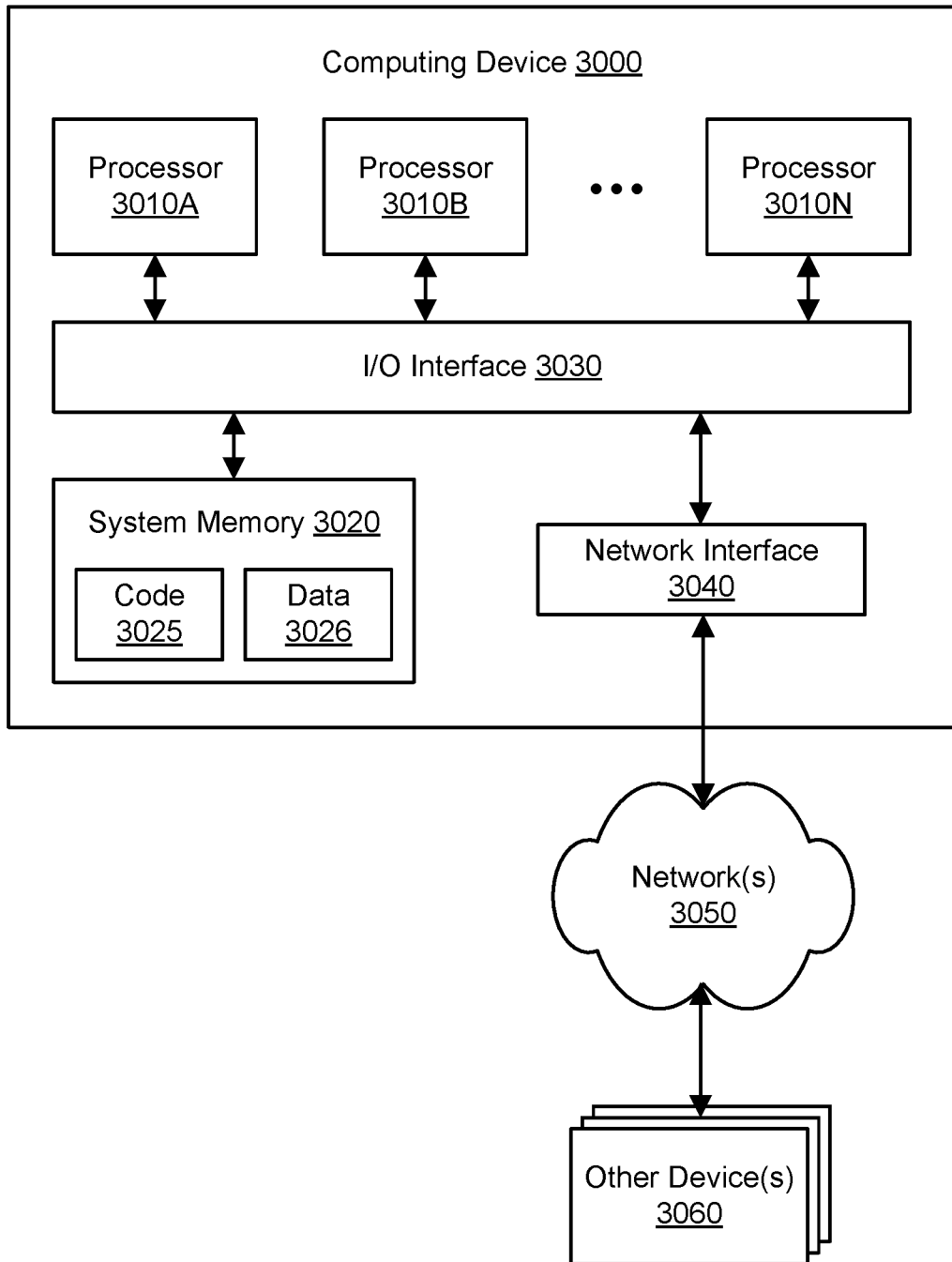
FIG. 8 illustrates an example computing device that may be used in some embodiments.

In various embodiments, components of the distributed database 100, such as the ingestion router fleet 110, control plane 130, stream processors 170A-170M, and/or storage hosts 180A-180B, may be implemented using any suitable number and configuration of computing devices, any of which may be implemented by the example computing device 3000 illustrated in FIG. 8. In some embodiments, the computing devices may be located in any suitable number of data centers or geographical locations. In various embodiments, at least some of the functionality of the distributed database 100 may be provided by the same computing device or by different computing devices. In various embodiments, if any of the components of the distributed database 100 are implemented using different computing devices, then the components and their respective computing devices may be communicatively coupled, e.g., via one or more networks. Any of the components of the distributed database 100 may represent any combination of software and hardware usable to perform their respective functions. In some embodiments, operations implemented by the distributed database 100 may be performed automatically, e.g., without a need for user initiation or user intervention after an initial configuration stage, and/or programmatically, e.g., by execution of program instructions on at least one computing device. In some embodiments, the distributed database 100 may include additional components not shown, fewer components than shown, or different combinations, configurations, or quantities of the components shown.

Clients 190 of the distributed database 100 may represent external devices, systems, or entities with respect to the database. In one embodiment, the client devices may be implemented using any suitable number and configuration of computing devices, any of which may be implemented by the example computing device 3000 illustrated in FIG. 8. Clients 190 may convey network-based service requests to the ingestion router fleet 110 via one or more networks, e.g., to supply a stream of data for processing using the stream processors 170A-170M. The network(s) may encompass any suitable combination of networking hardware and protocols necessary to establish network-based communications between client devices 190 and the distributed database 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the distributed database 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the distributed database 100. In one embodiment, client devices may communicate with the distributed database 100 using a private network rather than the public Internet. In various embodiments, the various components of the distributed database 100 may also communicate with other components of the distributed database using one or more network interconnects.

Figure 2:
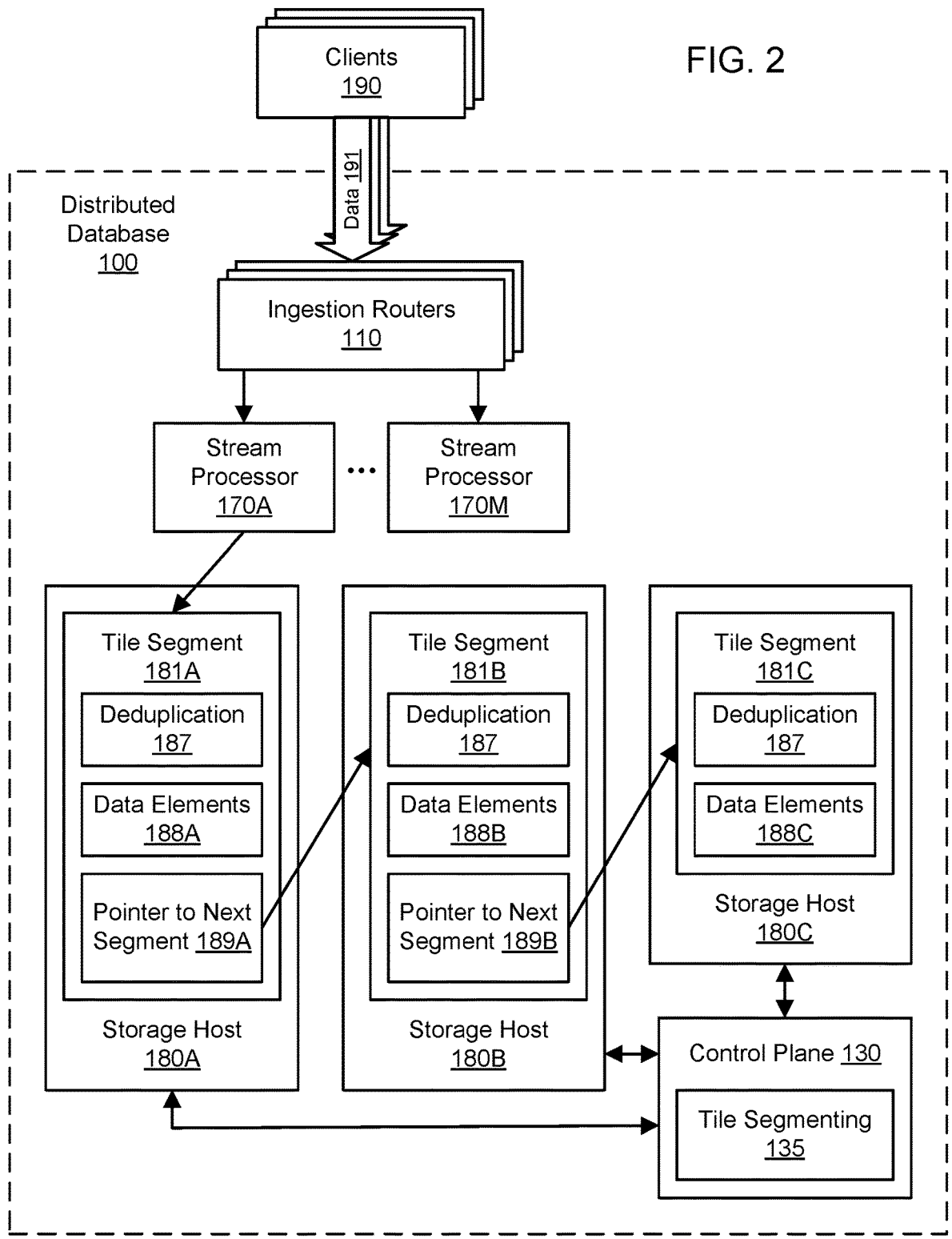
FIG. 2 illustrates further aspects of the example system environment for partition segmenting in a distributed time-series database, including the addition of a new tail segment to a chain of segments, according to one embodiment.

FIG. 2 illustrates further aspects of the example system environment for partition segmenting in a distributed time-series database, including the addition of a new tail segment to a chain of segments, according to one embodiment. FIG. 2 represents a continuation of the example of FIG. 1 at a later point in time. At some point, the control plane 130 may add yet another tail segment 181C to the tile. The existing segment 181A may remain the head segment, the existing segment 181B may become an intermediate segment, and the new segment 181C may represent a new tail segment. When the new tail segment 181C is added, the data elements 188B stored in the segment 181B may be deemed immutable, such that no new data may be written to the segment 181B and no existing data may be deleted from the segment 181B. As a non-terminal segment, the intermediate segment 181B may include a pointer or other reference 189B to the next segment 181C in the chain. The new segment 181C may be used to store a different set of data elements 188C than the head segment 181A or the intermediate segment 181B. The data elements 188A, 188B, and 188C may be within the same temporal and spatial boundaries of the tile. However, the segments of the tile may be pairwise disjoint, such that the intersection of any two of the data elements 188A, the data elements 188B, and the data elements 188C is the empty set.

In one embodiment, the control plane 130 may add the new segment 181C based (at least in part) on the storage capacity of the storage host 180B (e.g., the volatile storage capacity provided by RAM, if tiles are stored in memory) or the tile segment 181B. In one embodiment, the 181B segment may be allocated with a maximum capacity, and the control plane 130 may monitor the remaining capacity of the segment or receive updates about the remaining capacity from the host 180B. For example, the addition of a new tail segment 181C may occur when the existing tail segment 181B is preparing to exhaust its designated storage capacity. As another example, the addition of a new tail segment 181C may occur when the existing tail segment 181B has already exhausted its storage capacity. In one embodiment, the segment 181B may not be allocated with a maximum capacity, but the storage capacity of its host 180B may be affected by the use of the host to store other tiles. Again, the control plane 130 may monitor the remaining capacity of the host 180B or receive updates about the remaining capacity from the host. Segmentation may be a local decision that is dependent upon the storage capacity (e.g., the volatile storage capacity provided by RAM) of a particular segment or host. The decision to add the segment 181C may be made by the control plane 130 and/or the host 180B that stores the current tail segment 181B.

In one embodiment, different segments of a tile may be stored using different storage hosts. To perform tile segmenting 135, the control plane 130 may select the storage host 180C for the new segment 181C from a set of available storage hosts. The control plane 130 may select the storage host 180C for the new segment based (at least in part) on the remaining storage capacity of the selected host. For example, if a first host has three gigabytes of available RAM while a second host has one gigabyte of available RAM, and neither the first nor the second host already stores a segment for a given tile, then the control plane 130 may select the first host to store a new segment for the tile. In one embodiment, a host may be selected for a new tile segment in order to maximize the capacity of the new tile and minimize the total number of segments for the tile. When a new tail segment is added to the tile shown in FIG. 2, the control plane 130 may instruct the selected host 180C to allocate a new tile segment 181C (e.g., in memory). The control plane 130 may also instruct the old tail segment 181B to add the pointer 189B to the new segment 181C. As discussed above, the old segment 181B may be deemed immutable such that no new data may be written to the data elements 188B and no existing data may be deleted from the data elements 188B. Additionally, the control plane may update a map of tile segments that it maintains.

As discussed above, the pairwise disjoint property of the various segments of a tile may be maintained by performing local deduplication 187 at each segment. When a data element is received by the distributed database 100, a stream processor 170A may send a request to store the data element to the head segment 181A of the tile whose temporal and spatial boundaries include the data element. The head segment 181A may perform deduplication 187 and discard the request if another data element of the same time series and with the same timestamp is already stored in the segment with the immutable set of data elements 188A. If not, then the head segment 181A may forward the request to the next segment in the chain using the pointer or reference 189A. The intermediate segment 181B may perform deduplication 187 and discard the request if another data element of the same time series and with the same timestamp is already stored in the segment with the immutable set of data elements 188B. If not, then the intermediate segment 181B may forward the request to the next segment in the chain using the pointer or reference 189B. The tail segment 181C may perform deduplication 187 and discard the request if another data element of the same time series and with the same timestamp is already stored in the segment with the data elements 188C. If not, then the tail segment 181C may store the newly ingested data element with the data elements 188C.

Figure 3:
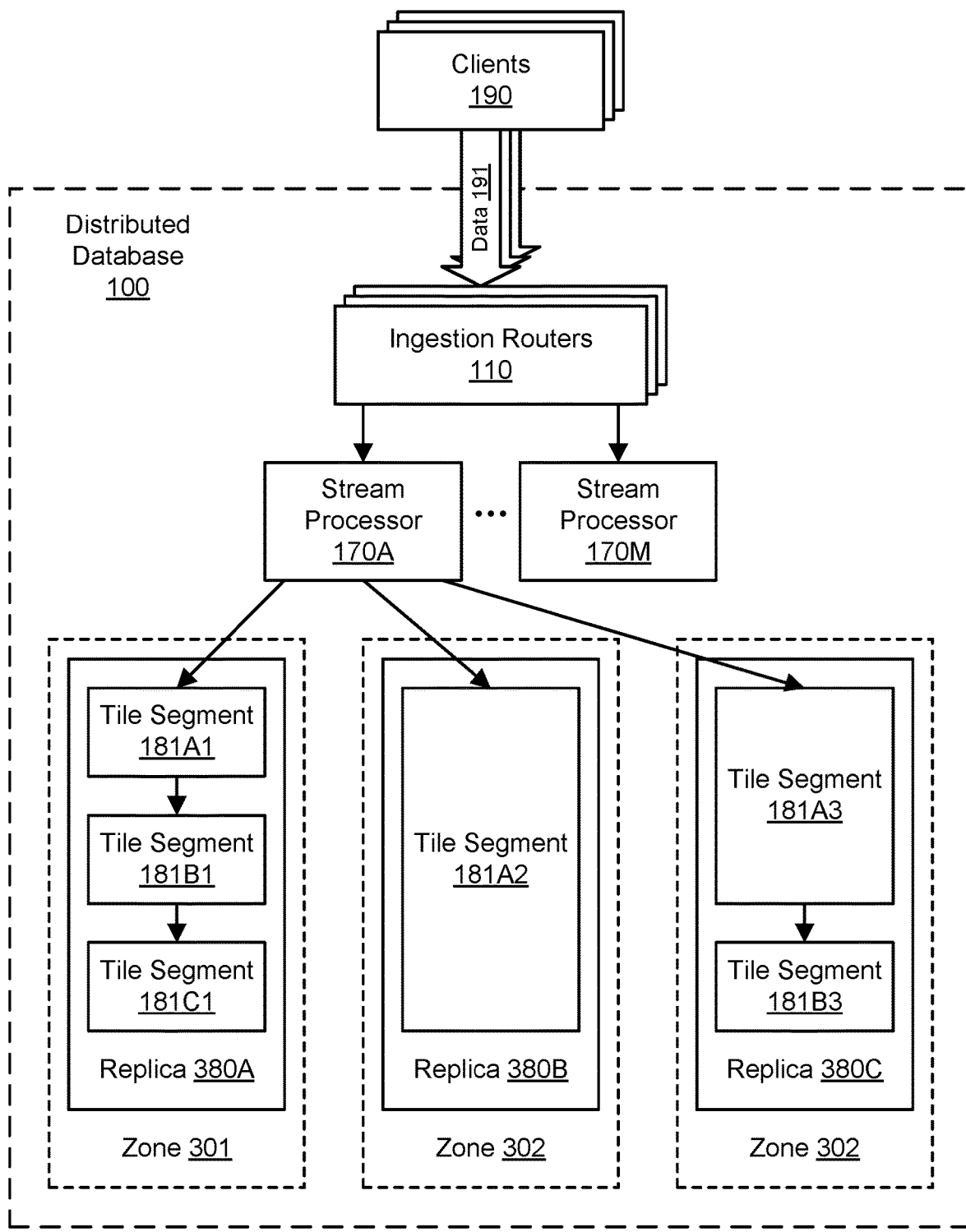
FIG. 3 illustrates further aspects of the example system environment for partition segmenting in a distributed time-series database, including the use of different segmentation schemes for different replicas of the same tile, according to one embodiment.

FIG. 3 illustrates further aspects of the example system environment for partition segmenting in a distributed time-series database, including the use of different segmentation schemes for different replicas of the same tile, according to one embodiment. In one embodiment, a tile may be replicated across the hot tier using multiple replicas. For example, data belonging to a particular partition or spatial range as well as a particular window of time may be replicated using a particular number of replicas (e.g., three) belonging to a particular replica group. The replicas in such a replica group may eventually represent the same content. Replicas within the same replica group may be located in different data centers, availability zones, or other logical or geographical locations to ensure high availability in the case of replica failure. As shown in FIG. 3, for example, one replica 380A may be stored in a first zone 301, another replica 380B may be stored in another zone 302, and yet another replica 380C may be stored in yet another zone 302. The use of replicas may provide lower latency and higher availability for queries, and the use of the various zones 301-303 may offer a degree of reliability to the database 100. For example, if one replica (or any of its segments) fails, then a healthy replica may be used to serve queries and/or hydrate a replacement of the failed replica.

Segmentation may be a local decision that is dependent upon the storage capacity of particular hosts, and so segmentation schemes may vary for replicas of the same tile, e.g., in different availability zones. Additionally, data may be ingested in a different order in one replica than in another replica. As shown in the example of FIG. 3, the replica 380A may include a chain or linked list of three segments 181A1, 181B1, and 181C1. The replica 380B may include only one large segment 181A2. The replica 308C may include two segments 181A3 and 181B3. Despite the different segmentation schemes for the three replicas 380A-380C, the contents of the different replicas may be eventually consistent, such that the data elements stored in the replica 380A are the same as the data elements stored in the replica 380B and the same as the data elements stored in the replica 380C. In one embodiment, a new replica hydrated from an existing replica may have a different segmentation scheme, e.g., a different number of segments or segments of a different size. In one embodiment, a replica with an excessive number of segments may increase the latency of storing and querying data, and such a replica may be taken offline and replaced by a new replica having fewer segments but representing the same dataset.

Figure 4:
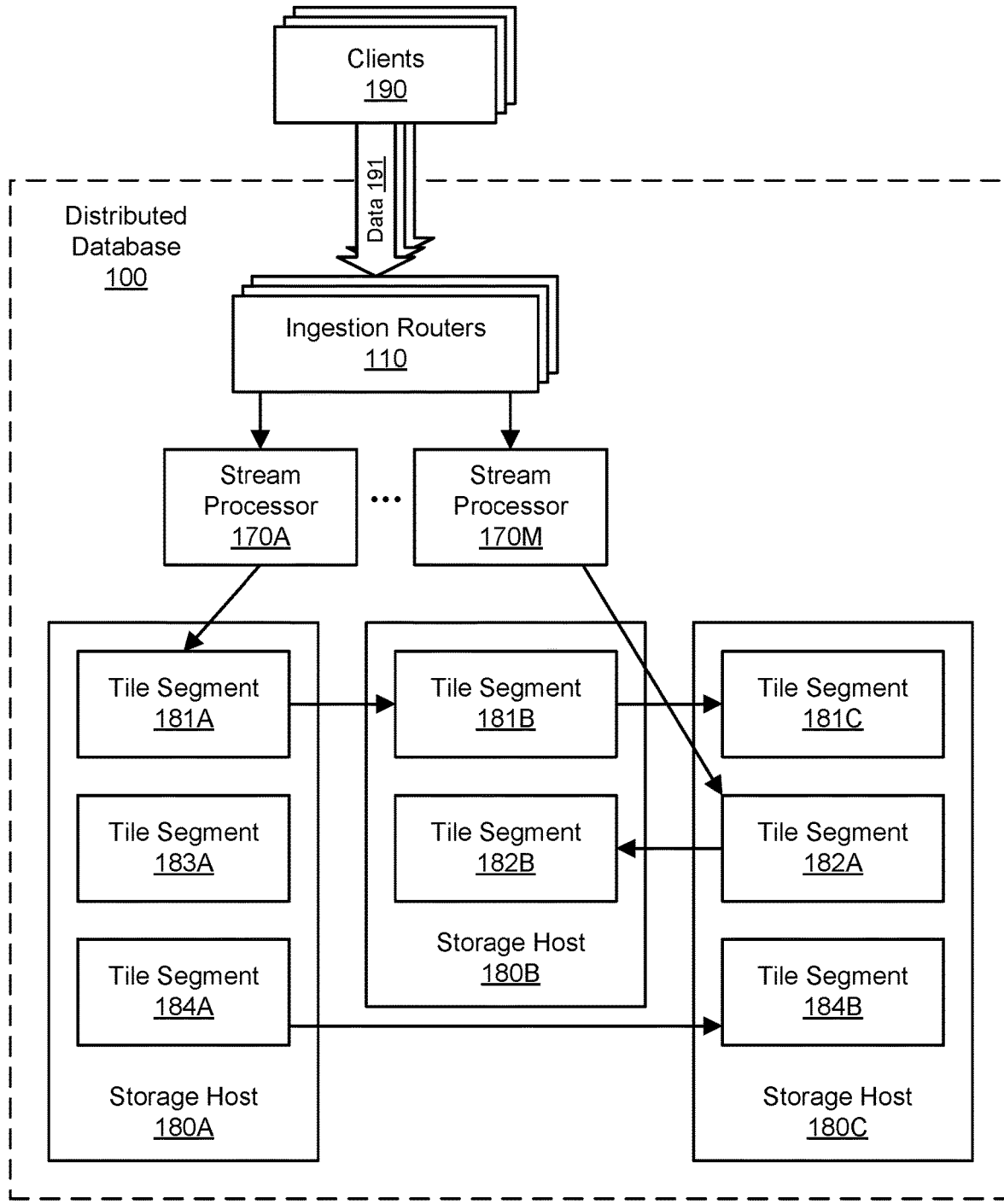
FIG. 4 illustrates further aspects of the example system environment for partition segmenting in a distributed time-series database, including the use of a storage host to store segments for different tiles, according to one embodiment.

FIG. 4 illustrates further aspects of the example system environment for partition segmenting in a distributed time-series database, including the use of a storage host to store segments for different tiles, according to one embodiment. In one embodiment, a given storage host of the distributed database 100 may store segments for more than one tile. For example, as discussed previously, the storage host 180A may store the head segment 181A of a particular tile, the storage host 180B may store an intermediate segment 181B of the tile, and the storage host 180C may store the tail segment 181C of the tile. Additionally, as shown in the example of FIG. 4, the host 180A may store the sole segment 183A for another tile. The host 180A may also store the head segment 184A of yet another tile, while the next and final segment 184B for the tile is stored by the host 180C. Similarly, the host 180C may store the head segment 182A for another tile, while the host 180B stores the next and final segment 182B for the tile. The existence of multiple tile segments on a given host may limit the ability of the host to expand the capacity of a given tile, and so a tile may be segmented across multiple hosts to use the collective storage resources of the host fleet with greater flexibility.

Figure 5:
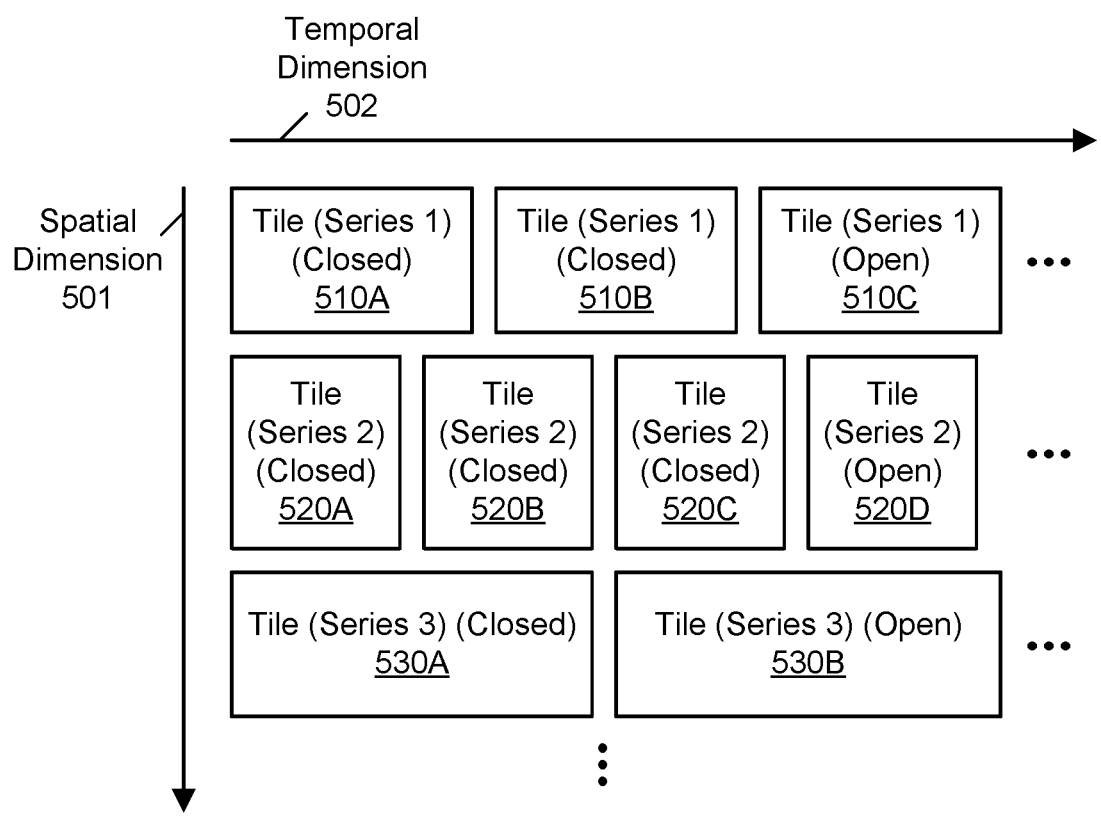
FIG. 5 illustrates an example of a set of tiles with spatial and temporal boundaries, according to one embodiment.

FIG. 5 illustrates an example of a set of tiles with spatial and temporal boundaries, according to one embodiment. As discussed above, different tiles may represent different data boundaries. As shown in the example of FIG. 5, the data contents of the distributed database 100 may be partitioned into two-dimensional tiles along a spatial dimension 501 and a temporal dimension 502. A given tile may represent non-overlapping spatial boundaries along a spatial dimension 501 such that the tile is designated to store data elements from one or more time series or other ranges of data. A given tile may also represent non-overlapping temporal boundaries along a time dimension 502 such that the tile is designated to store data elements having timestamps within a particular window of time. In one embodiment, a tile may be characterized or identified by an account identifier, table identifier, time range, and tablespace range. For a given time series, tiles representing older windows of time may be termed "closed" while a tile representing a current window of time may be termed "open." In one embodiment, an open tile may be closed (and a new open tile may be created for the time series) based (at least in part) on metrics of throughput and/or capacity. In one embodiment, closed tiles beyond the time window shown in FIG. 5 may expire and be deleted according to a retention policy associated with the time-series data and the particular storage tier.

For example, a first time series may be represented by a closed tile 510A representing a first time window, a closed tile 510B representing a second (but newer) time window, and an open tile 510C representing a current time window (e.g., with the window remaining open). The temporal boundaries may differ from time series to time series. For example, a second time series may be represented by a closed tile 520A representing a first time window, a closed tile 520B representing a second (but newer) time window, another closed tile 520B representing a third (but even newer) time window, and an open tile 520D representing a current time window (e.g., with the window remaining open). As another example, a third time series may be represented by a closed tile 530A representing a first time window and an open tile 530B representing a current time window (e.g., with the window remaining open). Ingested data elements may typically belong to the window of time associated with the open tile for the corresponding time series. Nevertheless, older data elements may be received under some circumstances, and such out-of-order data may belong to the window of time of a closed tile. To observe the temporal and spatial boundaries of the tiles, the out-of-order data may be written to the appropriate closed tile using tile segmentation described herein.

Figure 6:
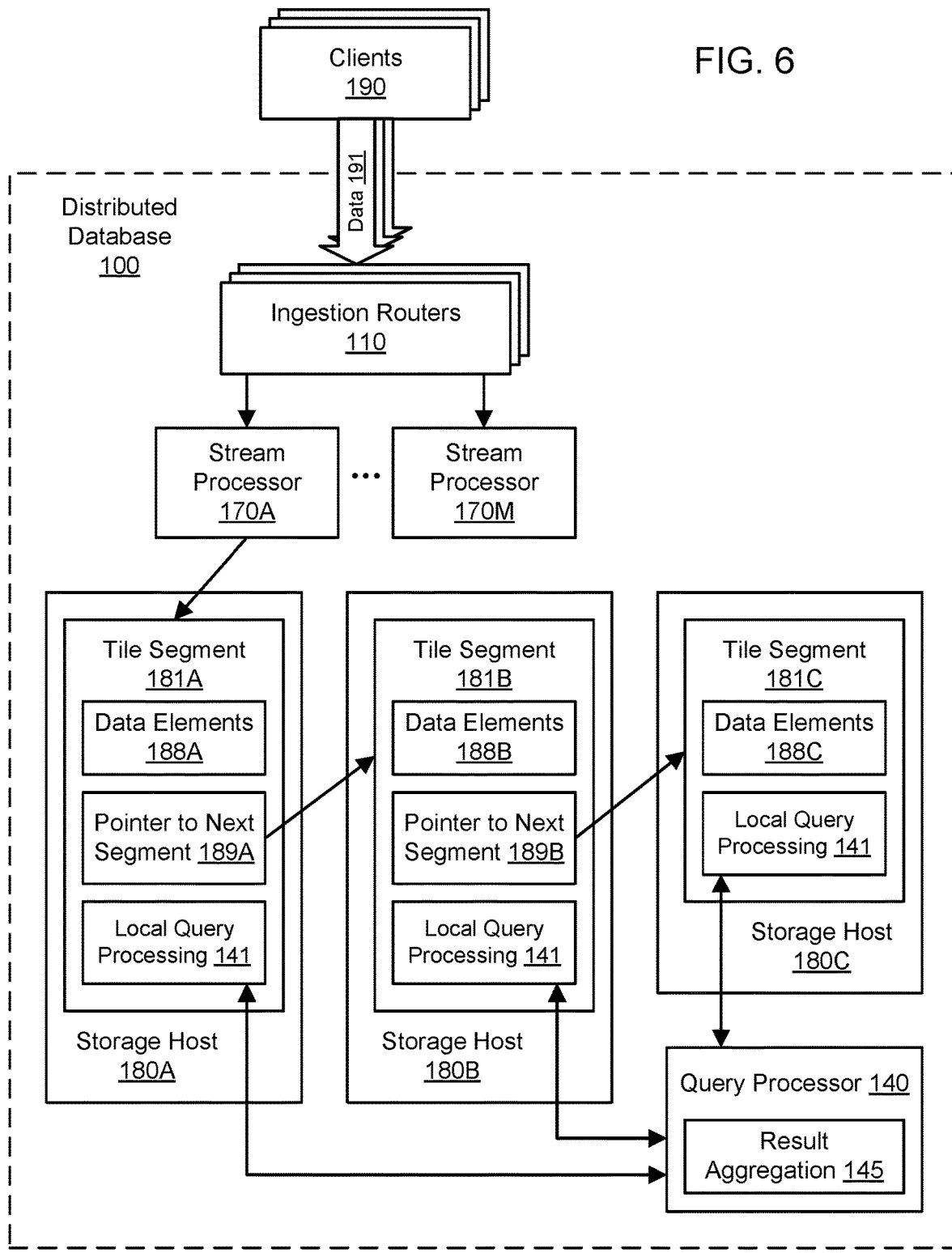
FIG. 6 illustrates further aspects of the example system environment for partition segmenting in a distributed time-series database, including a query processor that interacts with individual segments in performing queries, according to one embodiment.

FIG. 6 illustrates further aspects of the example system environment for partition segmenting in a distributed time-series database, including a query processor that interacts with individual segments in performing queries, according to one embodiment. As discussed above, the local deduplication 187 or forwarding may continue down the chain of segments until a newly ingested data element is discarded or stored in the tail segment. By using a chain of segments to store data elements within a common set of spatial and temporal boundaries, but performing deduplication to eliminate the storage of duplicate data, the segments may be queried efficiently by a query processor 140. The query processor 140 may perform query predicate pushdown to individual segments such as segments 181A, 181B, and 181C. For example, if a query seeks to determine the number of unique data elements in the tile, then the query processor 140 may ask for the number of unique of data elements in each individual segment. In one embodiment, the query processor 140 may query all of the segments of a replica because the different segments may not represent distinct and nonoverlapping time ranges. A local query processing component 141 associated with each segment may perform a local query and send the individual results back to the query processor 140. The query processor 140 may use a result aggregation component 145 to aggregate the results from the segments without needing to perform additional deduplication or complex filtering of the results. For example, with deduplication having already been performed in storing the data elements, and the segments being pairwise disjoint, the sum of values for each segment can simply be summed by the query processor 140 into a total sum representing the entire tile.

Figure 7:
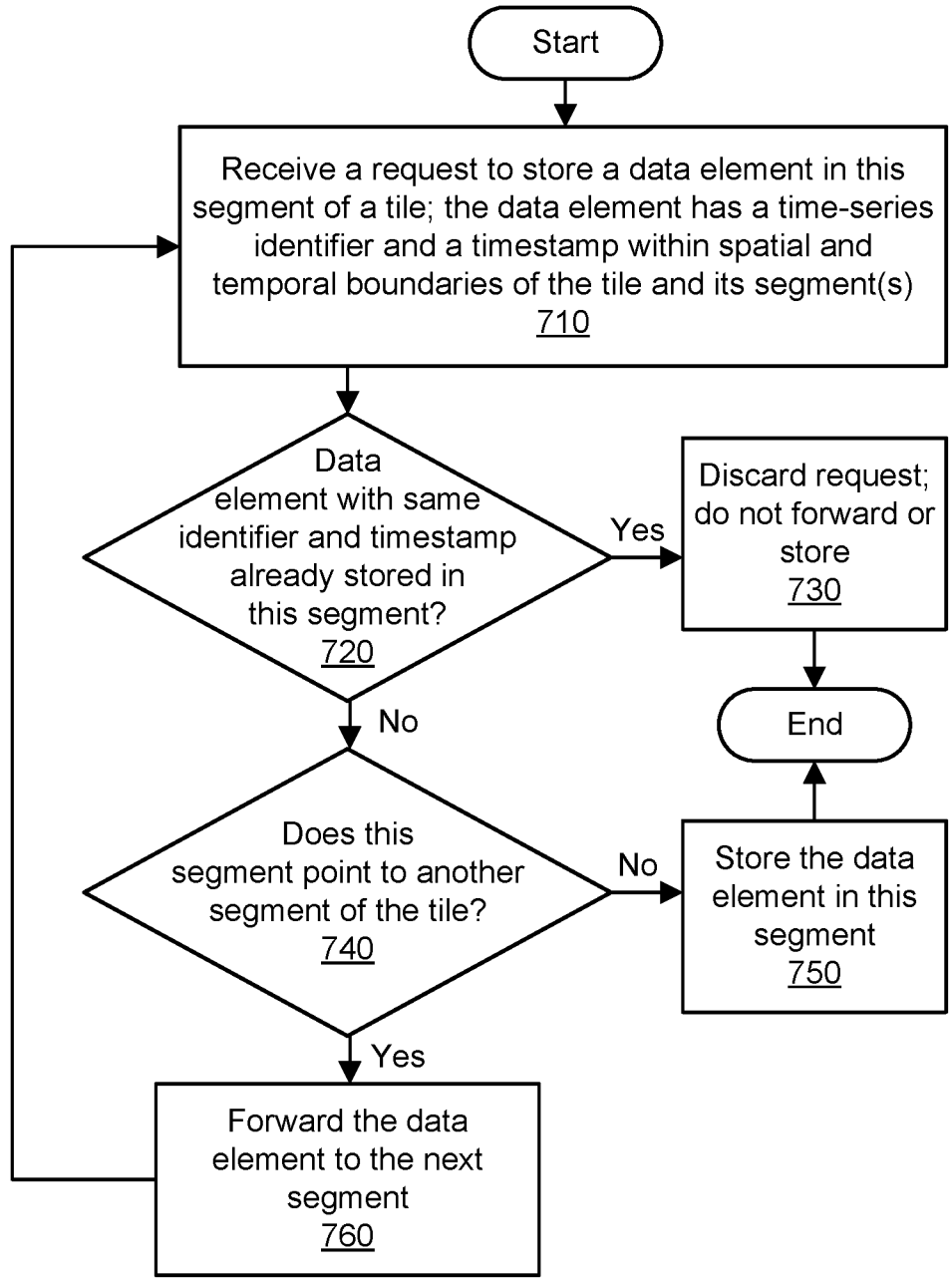
FIG. 7 is a flowchart illustrating a method for partition segmenting in a distributed time-series database, according to one embodiment.

FIG. 7 is a flowchart illustrating a method for partition segmenting in a distributed time-series database, according to one embodiment. As shown in 710, a request to store a data element in a tile segment may be received by a storage host that maintains the tile segment. The tile and its segments (if more than one) may represent the same spatial and temporal boundaries, and the data element may have values, such as a time series identifier and a timestamp, that fall within those boundaries. As shown in 720, the method may determine whether a data element with the same time series identifier and the same timestamp is already stored in this segment. If so, then as shown in 730, the request (and the accompanying data element) may be discarded and not stored or forwarded to any other component for potential storage. The discarding may be acknowledged by the storage node to the relevant stream processor.

If a data element with the same time series identifier and the same timestamp is not already stored in this segment, then as shown in 740, the method may determine whether this segment points to another segment of the tile. If this segment does not have such a pointer and is thus a tail segment, then as shown in 750, the data element may be stored in this segment. The write may be acknowledged by the storage node to the relevant stream processor. In one embodiment, a new tail segment may be added to the tile prior to the existing tail segment exhausting its storage capacity. If this segment does have such a pointer and thus is not a tail segment, then as shown in 760, the request (and the accompanying data element) may be forwarded to the next segment using the pointer or reference. The next segment may be maintained by a different storage host, and so the request may be forwarded over a network connection between the two hosts. The method may continue as shown in 710 until the data element is deduplicated and discarded at a segment or stored in the tail segment. The potential deduplication at each segment may maintain the pairwise disjoint property of the segments.

Illustrative Computer System

In at least some embodiments, a computer system that implements a portion or all of one or more of the technologies described herein may include a computer system that includes or is configured to access one or more computer-readable media. FIG. 8 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or nonvolatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 8 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a first host storing a head segment of a linked list representing a tile, wherein the head segment stores a first set of data elements having characteristics within spatial and temporal boundaries of the tile, and wherein the first host comprises a first one or more processors and a first one or more memories to store first computer-executable instructions that, if executed, cause the first host to:
receive, from a stream processor, a request to store a data element in the tile, wherein the data element is within the spatial and temporal boundaries of the tile;

determine that the data element is not stored in the head segment; and forward the request to a next segment in the linked list; and a second host storing a tail segment of the linked list representing the tile, wherein the tail segment stores a second set of data elements having characteristics within the spatial and temporal boundaries of the tile, and wherein the second host comprises a second one or more processors and a second one or more memories to store second computer-executable instructions that, if executed, cause the second host to:

receive the request to store the data element in the tile;

determine that the data element is not stored in the tail segment; and store the data element in the tail segment.

2. The system as recited in claim 1, wherein the first host comprises third computer-executable instructions that, if executed, cause the first host to:

receive, from the stream processor, an additional request to store an additional data element in the tile, wherein the additional data element is associated with a time-series identifier and a timestamp within the spatial and temporal boundaries of the tile;

determine that a data element having the time-series identifier and the timestamp is stored in the head segment; and discard the additional request, wherein the additional data element is not sent to the next segment.

3. The system as recited in claim 1, further comprising:

a control plane configured to select an additional host to store a new tail segment, wherein the new tail segment is associated with the spatial and temporal boundaries, wherein the new tail segment is added to the linked list based at least in part on a storage capacity of the tail segment, and wherein the tail segment is prevented from storing new data elements.

4. The system as recited in claim 1, wherein a first replica of the tile stores a set of data elements using a plurality of segments including the head segment and the tail segment, and wherein a second replica of the tile stores the set of data elements using a different number of segments than the first replica of the tile.

5. A method, comprising:

receiving, by a first host, a request to store a data element in a tile comprising a head segment and a tail segment, wherein the head segment is associated with spatial and temporal boundaries, and wherein the data element is within the spatial and temporal boundaries;

determining, by the first host, that the data element is not stored in the head segment;

receiving, by an additional host, a request to store the data element in the tail segment, wherein the tail segment is associated with the spatial and temporal boundaries;

determining, by the additional host, that the data element is not stored in the tail segment; and storing, by the additional host, the data element in the tail segment.

6. The method as recited in claim 5, wherein the spatial and temporal boundaries represent one or more time-series identifiers and a time range, and wherein the spatial and temporal boundaries are nonoverlapping with respect to boundaries of a plurality of additional tiles.

7. The method as recited in claim 5, further comprising:

receiving, by the first host, an additional request to store an additional data element in the tile, wherein the additional data element is associated with a time-series identifier and a timestamp within the spatial and temporal boundaries;

determining, by the first host, that a data element having the time-series identifier and the timestamp is stored in the head segment; and discarding, by the first host, the additional request, wherein the additional data element is not sent to a next segment of the tile.

8. The method as recited in claim 5, further comprising:

receiving, by the first host, an additional request to store an additional data element in the tile, wherein the additional data element is associated with a time-series identifier and a timestamp within the spatial and temporal boundaries;

determining, by the first host, that a data element having the time-series identifier and the timestamp is not stored in the head segment;

forwarding, by the first host, the additional data element to a next segment of the tile;

receiving, by the additional host, an additional request to store the additional data element in the tail segment;

determining, by the additional host, that a data element having the time-series identifier and the timestamp is stored in the tail segment; and discarding, by the additional host, the additional request to store the additional data element in the tail segment.

9. The method as recited in claim 5, wherein the spatial and temporal boundaries represent a time-series identifier and an older time window associated with the tile, wherein a newer tile has spatial and temporal boundaries representing the time-series identifier and a newer time window, and wherein the data element has a timestamp within the older time window.

10. The method as recited in claim 5, further comprising:

selecting, by a control plane, a new host for a new tail segment, wherein the new tail segment is associated with the spatial and temporal boundaries, and wherein the new tail segment is added to the tile based at least in part on a storage capacity of the tail segment.

11. The method as recited in claim 5, further comprising:

sending, by a query processor, a query predicate to the first host and the additional host, wherein contents of individual segments of a replica of the tile are mutually disjoint.

12. The method as recited in claim 5, wherein a first replica of the tile stores a set of data elements using a plurality of segments including the head segment and the tail segment, and wherein a second replica of the tile stores the set of data elements using a different number of segments than the first replica of the tile.

13. The method as recited in claim 5, further comprising:

generating, by a control plane, a new replica of the tile; and populating the new replica using a set of data elements stored in an existing replica of the tile, wherein the new replica comprises fewer segments than the existing replica of the tile.

14. One or more non-transitory computer-readable storage media storing program instructions that, when executed on or across one or more processors, perform:

receiving, by a first host, a request to store a data element in a replica of a partition comprising a plurality of linked segments including a head segment and a tail segment, wherein the head segment stores a first set of data elements having characteristics within spatial and temporal boundaries of the partition, and wherein the data element is within the spatial and temporal boundaries of the partition;

determining, by the first host, that the data element is not stored in the head segment;

receiving, by an additional host, a request to store the data element in the tail segment, wherein the tail segment stores an additional set of data elements having characteristics within the spatial and temporal boundaries of the partition;

determining, by the additional host, that the data element is not stored in the tail segment; and storing, by the additional host, the data element in the tail segment.

15. The one or more non-transitory computer-readable storage media as recited in claim 14, further comprising additional program instructions that, when executed on or across the one or more processors, perform:

receiving, by the first host, an additional request to store an additional data element in the replica of the partition, wherein the additional data element is associated with a time-series identifier and a timestamp within the spatial and temporal boundaries;

determining, by the first host, that a data element having the time-series identifier and the timestamp is stored in the head segment; and discarding, by the first host, the additional request, wherein the additional data element is not sent to a next segment of the replica of the partition.

16. The one or more non-transitory computer-readable storage media as recited in claim 14, wherein the spatial and temporal boundaries represent a time-series identifier and an older time window associated with the partition, wherein a newer partition has spatial and temporal boundaries representing the time-series identifier and a newer time window, and wherein the data element has a timestamp within the older time window.

17. The one or more non-transitory computer-readable storage media as recited in claim 14, further comprising additional program instructions that, when executed on or across the one or more processors, perform:

selecting, by a control plane, a new host for a new tail segment, wherein the new tail segment is associated with the data boundaries, and wherein the new tail segment is added to the replica of the partition based at least in part on a storage capacity of the tail segment.

18. The one or more non-transitory computer-readable storage media as recited in claim 14, further comprising additional program instructions that, when executed on or across the one or more processors, perform:

sending, by a query processor, a query predicate to the first host and the additional host, wherein contents of individual segments of the replica of the partition are mutually disjoint.

19. The one or more non-transitory computer-readable storage media as recited in claim 14, wherein the replica of the partition stores a set of data elements using a plurality of segments including the head segment and the tail segment, and wherein an additional replica of the partition stores the set of data elements using a different number of segments than the partition.

20. The one or more non-transitory computer-readable storage media as recited in claim 14, further comprising additional program instructions that, when executed on or across the one or more processors, perform:

generating, by a control plane, a new replica of the partition; and populating the new replica using a set of data elements stored in the replica of the partition, wherein the new replica comprises fewer segments than the replica.

* * * * *